United States Patent
Jin et al.

(10) Patent No.: US 12,123,256 B2
(45) Date of Patent: Oct. 22, 2024

(54) RECHARGEABLE ELECTRIC EXTERNALLY-HUNG VENETIAN BLIND ASSEMBLY

(71) Applicant: CHANGSHU HIGH-TECH ENERGY-SAVING DORWIN CO., LTD, Changshu (CN)

(72) Inventors: Chengzhe Jin, Changshu (CN); Xiangjun An, Changshu (CN)

(73) Assignee: CHANGSHU HIGH-TECH ENERGY-SAVING DORWIN CO., LTD, Changshu (CN)

( * ) Notice: Subject to any disclaimer, the term of this patent is extended or adjusted under 35 U.S.C. 154(b) by 460 days.

(21) Appl. No.: 17/553,846

(22) Filed: Dec. 17, 2021

(65) Prior Publication Data

US 2022/0235606 A1     Jul. 28, 2022

(30) Foreign Application Priority Data

Jan. 27, 2021   (CN) .......................... 202110112251.9

(51) Int. Cl.
*E06B 9/32*      (2006.01)
*E06B 9/322*     (2006.01)
*H01M 10/052*    (2010.01)
*H01M 10/42*     (2006.01)
*H01M 10/46*     (2006.01)
*H02J 7/35*      (2006.01)

(52) U.S. Cl.
CPC ........... *E06B 9/322* (2013.01); *H01M 10/052* (2013.01); *H01M 10/425* (2013.01); *H01M 10/465* (2013.01); *H01M 2220/10* (2013.01); *H02J 7/35* (2013.01)

(58) Field of Classification Search
CPC ... E06B 9/322; E06B 9/68; E06B 9/72; E06B 2009/2476; E06B 9/26; E06B 9/266; E06B 9/32; E06B 9/323; H01M 10/425; H01M 10/465; H01M 2210/10; H02J 7/35
USPC ..................................................... 160/168.1 P
See application file for complete search history.

(56) References Cited

U.S. PATENT DOCUMENTS

| 1,949,653  | A  | * | 3/1934  | Moore  | E06B 9/304   |
|            |    |   |         |        | 160/176.1 R  |
| 8,413,706  | B2 | * | 4/2013  | Kotin  | E06B 9/386   |
|            |    |   |         |        | 160/236      |
| 11,421,472 | B2 | * | 8/2022  | Jin    | E06B 9/264   |
| 11,462,871 | B2 | * | 10/2022 | Kovach | E06B 9/322   |

(Continued)

*Primary Examiner* — Beth A Stephan
(74) *Attorney, Agent, or Firm* — Bayramoglu Law Offices LLC

(57) ABSTRACT

A rechargeable electric externally-hung venetian blind assembly includes a venetian blind main body and a controller. The top of the venetian blind main body is provided with an upper cover, and the controller is detachably installed on the surface of the upper cover and controls the lifting and lowering of the venetian blind main body. Two ends of the upper cover are provided with a sealing cover, and the sealing cover and the upper cover enclose an accommodating space. When the venetian blind main body is in a tightened state, the venetian blind main body is accommodated in the accommodating space to avoid damage during transportation. The rechargeable electric externally-hung venetian blind assembly achieves the technical effects of convenient and safe transportation and easy installation, use and maintenance.

9 Claims, 4 Drawing Sheets

(56) References Cited

U.S. PATENT DOCUMENTS

| | | | |
|---|---|---|---|
| 2005/0252620 A1* | 11/2005 | Lin | E06B 9/32 |
| | | | 160/168.1 P |
| 2006/0121337 A1* | 6/2006 | Cheng | H01M 50/213 |
| | | | 429/97 |
| 2006/0169419 A1* | 8/2006 | Cheng | E06B 9/32 |
| | | | 160/168.1 P |
| 2012/0073765 A1* | 3/2012 | Hontz | E06B 9/304 |
| | | | 160/331 |
| 2017/0362888 A1* | 12/2017 | Vinogradova | E06B 9/68 |
| 2020/0018115 A1* | 1/2020 | Chen | E06B 9/322 |
| 2023/0124677 A1* | 4/2023 | Negrello | E06B 9/322 |
| | | | 160/168.1 P |
| 2024/0151102 A1* | 5/2024 | Sweitzer | E06B 9/327 |

\* cited by examiner

RECHARGEABLE ELECTRIC EXTERNALLY-HUNG VENETIAN BLIND ASSEMBLY

CROSS REFERENCE TO THE RELATED APPLICATIONS

This application is based upon and claims priority to Chinese Patent Application No. 202110112251.9, filed on Jan. 27, 2021, the entire contents of which are incorporated herein by reference.

TECHNICAL FIELD

The present invention relates to the technical field of louvres, particularly relates to an electric louvre, in particular to a rechargeable electric externally-hung venetian blind assembly.

BACKGROUND ART

Louvres are a style of windows, which originate from China. Mullion windows are applied to ancient Chinese buildings and are used in all dynasties from the Warring States Period to the Han Dynasty. The vertical bars are called mullion windows, and the horizontal bars are called horizontal lattice windows. The horizontal lattice window is an original style of the louvres, or, it can be called the original state of the louvres.

The modern louvres are invented by the Americans, named John Hampson, and a patent for the invention is granted on Aug. 21, 1841. The louvres are generally relatively wide, and are generally used for indoor and outdoor shading and ventilation. Louvre curtain walls that more and more people agree with also evolve from the louvres. The louvre curtain walls have many functional advantages and are very beautiful, and thus are generally used in high-rise buildings. Louvre is a window with louvres installed, which is different from a venetian blind. The venetian blind is similar to a curtain, which has smaller leaves, can be folded up and is common on our TVs or in daily lives.

However, in the process of implementing the technical solution in the prior art, the applicant finds the following technical problems in the technical solution in the prior art:

The main function of the electric louvres in the prior art is to electrically open and close up and down. Before the installation of the common electric louvres presently on the market, grooves need to be dug on walls to pre-bury wires, holes are drilled to reserve controller installation slots, electric louvre controllers and electric louvres are installed, and the electric louvres are connected to the electric louvre controllers. Thereafter the electric louvres can be controlled to ascend, descend and turn over. Therefore the installation is very inconvenient, and sometimes the electric louvres cannot be controlled at all without electricity.

In addition, the common electric externally-hung curtains on the market at present are equipped with batteries in motors. It is inconvenient to connect charging wires when charging, and when the batteries are damaged, the batteries cannot be repaired or replaced. The venetian blinds are easily deformed and damaged during transportation.

SUMMARY

The technical problem to be solved by the present invention is to provide a rechargeable electric externally-hung venetian blind assembly. The technical problems in the prior art, that louvres are easily damaged during transportation, are inconvenient to install, use, and maintain, are solved. The technical effects of convenient and safe transportation and easy installation, use, and maintenance are achieved.

In order to solve the above technical problems, the technical solutions of the present invention are as follows:

A rechargeable electric externally-hung venetian blind assembly includes a venetian blind main body and a controller, wherein the top of the venetian blind main body is provided with an upper cover, and the controller is detachably installed on the surface of the upper cover and controls the lifting and lowering of the venetian blind main body; two ends of the upper cover are provided with a sealing cover, and the sealing cover and the upper cover enclose an accommodating space; and when the venetian blind main body is in a tightened state, the venetian blind main body is accommodated in the accommodating space to avoid damage during transportation.

Preferably, the controller is provided with a lithium battery that can be charged by a mobile phone charger, and when charging is required, the controller is taken down for charging.

Preferably, the rechargeable electric externally-hung venetian blind assembly further includes a solar panel, and the solar panel is arranged in the upper cover and is electrically connected to the controller; and when the lithium battery or the solar panel needs to be overhauled, the lithium battery or the solar panel can be directly detached for overhaul.

More preferably, the controller is compatible with a mobile device application, and the venetian blind main body can be opened and closed through the mobile device application to adjust the brightness.

Particularly preferably, the rechargeable electric externally-hung venetian blind assembly includes a venetian blind upper rail, a reel, an upper cover, a cover plate, a hexagonal aluminum rod, a motor, a stopper, a winding barrel, a rope fixator, a winding barrel bracket, a winding barrel fixing frame, a locking ring, a ladder belt rope, a lifting rope, a sealing cover, a hiding cover, a wire connector and an installation code, which are located above the venetian blind main body; the venetian blind upper rail is formed by buckling the cover plate to the upper cover; the reel is inserted into the winding barrel by the rope fixator; the winding barrel is inserted into a hole of the winding barrel bracket; the winding barrel fixing frame is installed above the winding barrel bracket and the winding barrel; the hexagonal aluminum rod is inserted into the reel, the locking ring, the stopper and the motor and is installed in the notch of the upper cover; and the cover plate is buckled on the upper cover.

Preferably, the motor is provided with a white wire, and the stopper is provided with a black wire; and the white wire and the black wire are connected together by a connecting terminal.

Preferably, the black wire and the white wire pass through the notch of the upper cover, pass through a wire outlet hole of the upper cover and are connected to the wire connector.

More preferably, the venetian blind main body is inserted into the notch on the top of the upper rail of the venetian blind main body to block the leaking wires of the motor and the stopper; and the sealing cover is inserted into the notch on the side face of the upper rail of the venetian blind main body.

Particularly preferably, a 3M double faced adhesive tape is attached to the back of the wire connector and is attached to the surface of the upper cover; the controller is installed on the wire connector; a 3M double faced adhesive tape is attached to the back of the solar panel and is attached to the surface of the cover plate; the charging connector is inserted into the charging port of the controller.

One or more technical solutions provided by the present application have at least the following technical effects or advantages:

In the above technical solution, since a series of technical means are adopted, that is, the top of the venetian blind main body is provided with the upper cover, the controller is detachably installed on the surface of the upper cover and controls the lifting and lowering of the venetian blind main body, the two ends of the upper cover are provided with the sealing cover, and the sealing cover and the upper cover enclose the accommodating space, when the venetian blind main body is in the tightened state, the venetian blind main body is accommodated in the accommodating space, thereby saving the accommodating space and improving the protective effect of the accommodating. It is neither necessary to dig a groove in the wall to pre-bury wires before installation nor to drill a hole to reserve a controller installation slot, so as to install the electric louvre controller and the electric louvre and to connect the electric louvre with the electric louvre controller thereafter. The technical problems in the prior art that louvres are easily damaged during transportation and are inconvenient to install, use and maintain are solved, and the technical effects of convenient and safe transportation and easy installation, use and maintenance are achieved.

In addition, by providing the solar panel, the power supply can be increased to avoid electric control failure when the battery is exhausted.

DETAILED DESCRIPTION OF THE EMBODIMENTS

Figure 1:
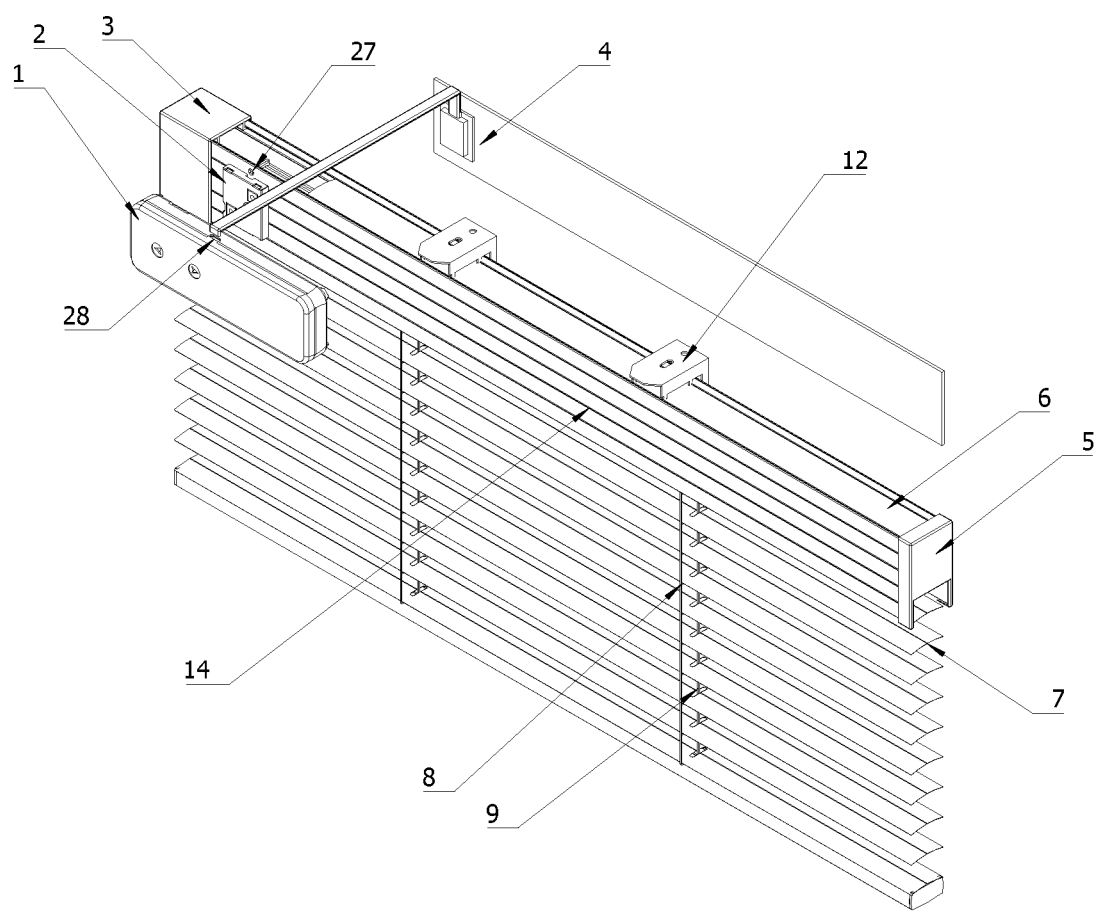
FIG. 1 is a schematic diagram of a front face structure of the present invention.

The specific embodiments of the present invention will be further described below in combination with the drawings. It should be noted here that the description of these embodiments is used to help understand the present invention, but does not constitute a limitation to the present invention. In addition, the technical features involved in the various embodiments of the present invention described below can be combined with each other as long as they do not conflict with each other.

Before the installation of the common electric louvres on the market at present, grooves need to be dug on walls to pre-bury wires, holes are drilled to reserve controller installation slots, then electric louvre controllers and electric louvres are installed, and the electric louvres are connected to the electric louvre controllers, thereafter the electric louvres can be controlled to ascend, descend and turn over, therefore the installation is very inconvenient, and sometimes the electric louvres cannot be controlled at all without electricity, resulting in the problems of difficult transportation and installation and inconvenient use. In addition, the common electric externally-hung curtains on the market at present are equipped with batteries in motors. It is inconvenient to connect charging wires when charging, and when the batteries are damaged, the batteries cannot be repaired or replaced. The venetian blinds are easily deformed and damaged during transportation.

The technical solution in the embodiment of the present application provides a rechargeable electric externally-hung venetian blind assembly to solve the problems in the prior art that louvres are easily damaged during transportation and are inconvenient to install, use and maintain. The top of a venetian blind main body is provided with an upper cover, and a controller is detachably installed on the surface of the upper cover and controls the lifting and lowering of the venetian blind main body; and two ends of the upper cover are provided with a sealing cover, and the sealing cover and the upper cover enclose an accommodating space, therefore the beneficial effects of convenient and safe transportation and easy installation, use and maintenance are achieved.

The general idea of the embodiment of the present invention to solve the above technical problems is as follows:

In a rechargeable electric externally-hung venetian blind assembly, a venetian blind controller is installed on the surface of an aluminum alloy upper cover on the top of the venetian blind, and the venetian blind is controlled by using the electric shock of a magnetic attraction function. The venetian blind controller is easy to install and disassemble. A lithium battery is installed in the controller, when charging is required, the controller is taken down and is charged by using a mobile phone charger, or a solar charging panel is installed to charge the controller. When the battery is damaged, it is easy to overhaul and replace the battery. The venetian blind can be controlled by a remote controller or a mobile device application App to open and close to adjust the brightness, and the mobile phone App can set a time to automatically open and close the venetian blind. The externally-hung venetian blind is protected by the upper cover in a blocking edge notch in a tightened state, and thus is not deformed or damaged during transportation.

In order to better understand the above technical solution, the above technical solution will be described in detail below in combination with the drawings of the specification and specific embodiments.

Figure 2:
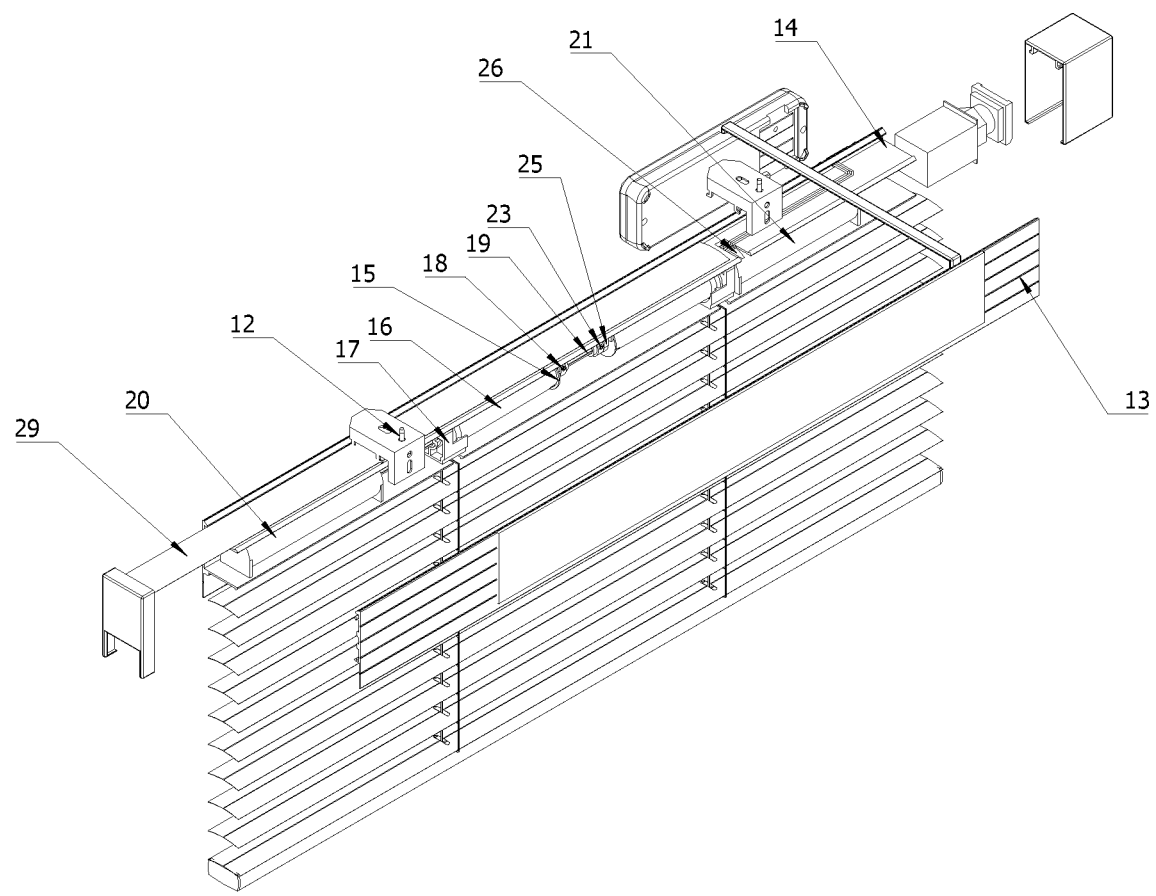
FIG. 2 is a schematic diagram of a back surface structure of the present invention.
Figure 3:
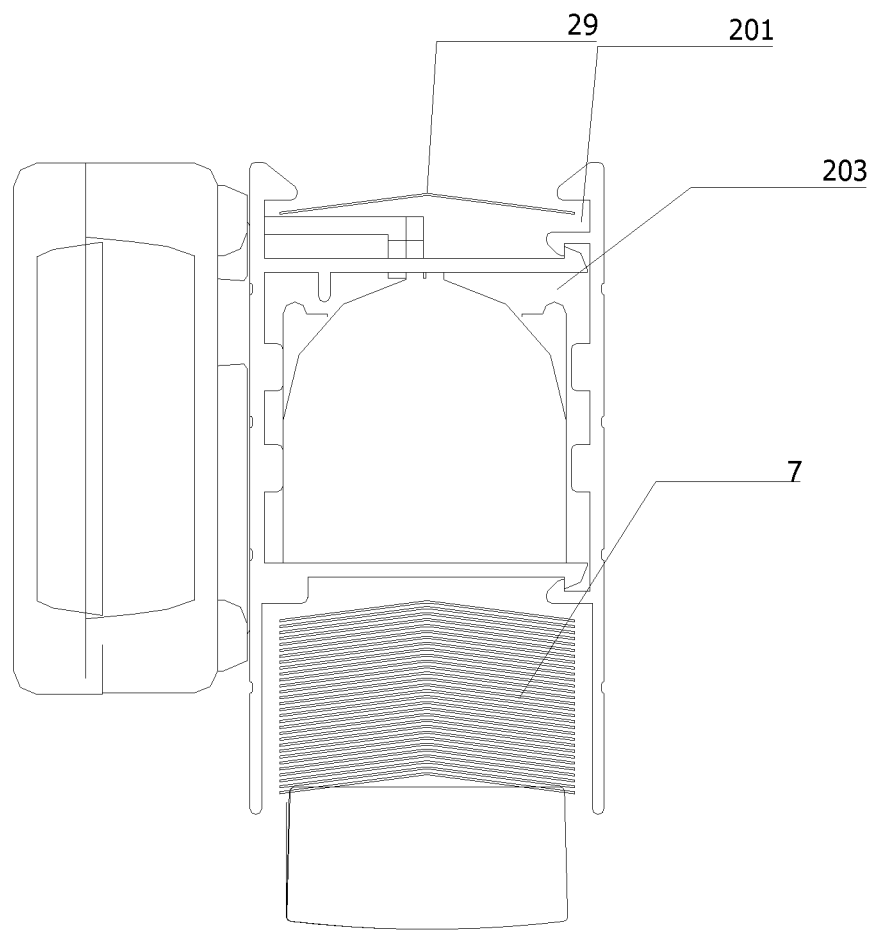
FIG. 3 is a side view of the present invention.
Figure 4:
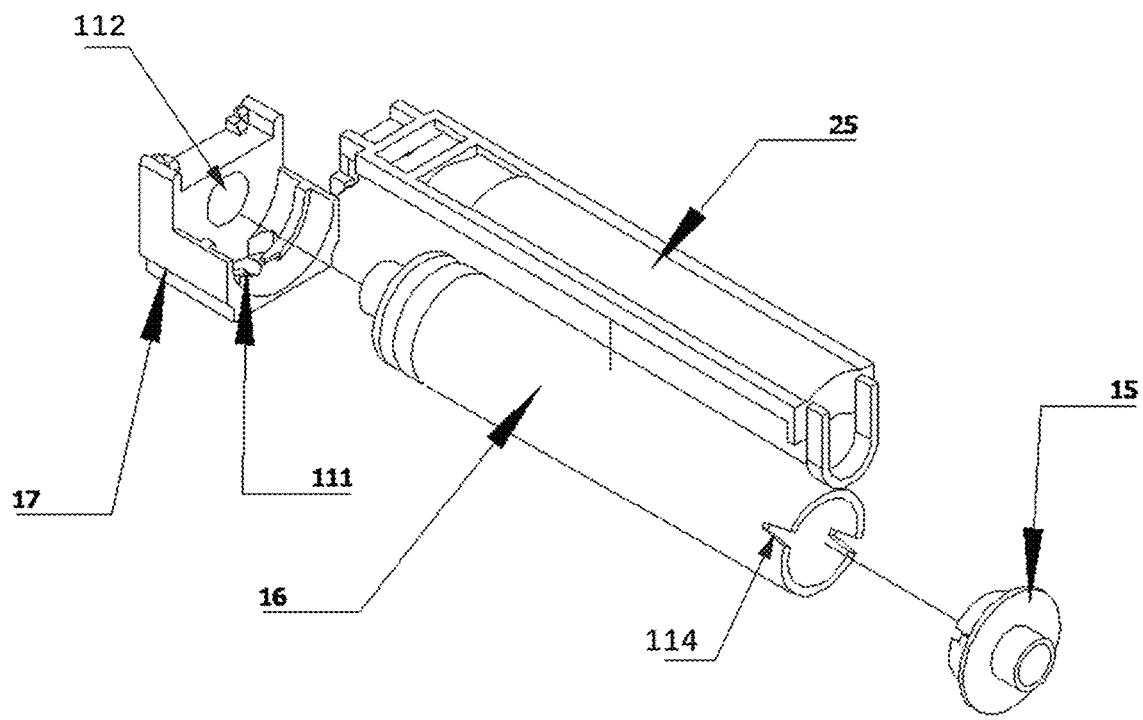
FIG. 4 is a schematic structure diagram of a reel in the present invention.

A rechargeable electric externally-hung venetian blind, as shown in FIG. 1 to FIG. 3, includes a venetian blind upper rail 6, a venetian blind main body 7, a reel 23, an upper cover 14, a cover plate 13, a hexagonal aluminum rod 19, a motor 20, a stopper 21, a winding barrel 16, a rope fixator 15, a winding barrel bracket 17, a winding barrel fixing frame 25, a locking ring 18, a ladder belt rope 8, a lifting rope 9, a sealing cover 5, a hiding cover 3, a wire connector 2, a controller 1, an installation code 12 and a solar charging panel 4, the venetian blind upper rail 6 is formed by buckling the cover plate 13 to the upper cover 14, as shown in FIG. 4, the reel 23 is inserted into the winding barrel 16 by the rope fixator 15, the assembled winding barrel 16 is inserted into a hole 111 of the winding barrel bracket 17, and finally the winding barrel fixing frame 25 is installed above the winding barrel bracket 17 and the winding barrel 16.

The venetian blind main body 7 is placed on a workbench, the lifting rope 9 is inserted into the hole 111 of the winding barrel bracket 17, is turned to the tail of the winding barrel 16 to be knotted, is put into the tail notch 114 of the winding barrel 16, and is buckled by the rope fixator 15 into the winding barrel 16 to fix the lifting rope 9, the ladder belt rope 8 is inserted into a hole of the winding barrel bracket 17, then after the winding barrel 16 is inserted into the ladder belt rope 8, the winding barrel 16 is inserted into a hole 112 of the winding barrel bracket 17, and finally, the winding barrel fixing frame 25 is installed above the winding barrel bracket 17 and the winding barrel 16.

The hexagonal aluminum rod 19 is inserted into the reel 23, the locking ring 18, the stopper 21 and the motor 20 and is installed in the notch of the upper cover.

A white wire of the motor 20 and a black wire of the stopper 21 are connected together by a connecting terminal, the black wire of the motor 20 and the white wire of the stopper 21 pass through a formed notch 26 on the upper cover 14, pass through a wire outlet hole 27 of the upper cover 14 and are connected to the wire connector 2, and then the cover plate 13 is buckled to the upper cover 14.

A louvre blade 29 is inserted into the notch 201 on the top of the venetian blind upper rail 6 to block the leaking wires of the motor 20 and the stopper 21, and then the sealing cover 5 is inserted into the notch 203 on the side face of the venetian blind upper rail 6.

A 3M double faced adhesive tape is attached to the back of the wire connector 2 and is attached to the surface of the upper cover 14, and then the controller 1 is installed on the wire connector 2.

A 3M double faced adhesive tape is attached to the back of the solar charging panel 4 and is attached to the surface of the cover plate 13, and a charging connector is inserted into the charging port 28 of the controller 1.

By adopting the above technical solution, when the venetian blind main body is in the tightened state, the venetian blind main body is accommodated in the accommodating space, thereby saving the accommodating space and improving the protective effect of the accommodating. It is neither necessary to dig a groove in the wall to pre-bury wires before installation nor to drill a hole to reserve a controller installation slot, so as to install the electric louvre controller and the electric louvre and to connect the electric louvre with the electric louvre controller thereafter. The technical problems in the prior art that louvres are easily damaged during transportation and are inconvenient to install, use and maintain are solved, and the technical effects of convenient and safe transportation and easy installation, use and maintenance are achieved.

The embodiments of the present invention have been described in detail above in combination with the drawings, but the present invention is not limited to the described embodiments. For those skilled in the art, without departing from the principle and spirit of the present invention, various changes, modifications, substitutions and variations made to these embodiments still fall within the protection scope of the present invention.

What is claimed is:

1. A rechargeable electric externally-hung venetian blind assembly, comprising a venetian blind main body and a controller, wherein
a top of the venetian blind main body is provided with an upper cover, and the controller is detachably installed on a surface of the upper cover and controls lifting and lowering of the venetian blind main body;
two ends of the upper cover are provided with a sealing cover and a hiding cover, respectively, and the sealing cover, the hiding cover and the upper cover enclose an accommodating space; and
when the venetian blind main body is in a tightened state, the venetian blind main body is accommodated in the accommodating space to avoid damage during transportation,
further comprising a venetian blind upper rail, a reel, a cover plate, a hexagonal aluminum rod, a motor, a stopper, a winding barrel, a rope fixator, a winding barrel bracket, a winding barrel fixing frame, a locking ring, a ladder belt rope, a lifting rope, a wire connector and an installation code, wherein the venetian blind upper rail, the reel, the upper cover, the cover plate, the hexagonal aluminum rod, the motor, the stopper, the winding barrel, the rope fixator, the winding barrel bracket, the winding barrel fixing frame, the locking ring, the ladder belt rope, the lifting rope, the sealing cover, the hiding cover, the wire connector and the installation code are located above the venetian blind main body; wherein
the venetian blind upper rail is formed by buckling the cover plate to the upper cover;
the reel is inserted into the winding barrel by the rope fixator;
the winding barrel is inserted into a hole of the winding barrel bracket;
the winding barrel fixing frame is installed above the winding barrel bracket and the winding barrel;
the hexagonal aluminum rod is inserted into the reel, the locking ring, the stopper and the motor, and the hexagonal aluminum rod is installed in a notch of the upper cover; and
the cover plate is buckled on the upper cover.

2. The rechargeable electric externally-hung venetian blind assembly according to claim 1, wherein
the controller is provided with a lithium battery, wherein the lithium battery is configured to be charged by a mobile phone charger, and when charging is required, the controller is taken down for charging.

3. The rechargeable electric externally-hung venetian blind assembly according to claim 2, further comprising a solar panel, wherein
the solar panel is arranged in the upper cover, and the solar panel is electrically connected to the controller; and
when the lithium battery or the solar panel needs to be overhauled, the lithium battery or the solar panel is configured to be directly detached for overhaul.

4. The rechargeable electric externally-hung venetian blind assembly according to claim 3, wherein
the controller is compatible with a mobile device application, and the venetian blind main body is configured to be opened and closed through the mobile device application to adjust a brightness.

5. The rechargeable electric externally-hung venetian blind assembly according to claim 1, wherein
the motor is provided with a white wire, and the stopper is provided with a black wire; and
the white wire and the black wire are connected together by a connecting terminal.

6. The rechargeable electric externally-hung venetian blind assembly according to claim 5, wherein
the black wire and the white wire pass through a notch of the upper cover, pass through a wire outlet hole of the upper cover and are connected to the wire connector.

7. The rechargeable electric externally-hung venetian blind assembly according to claim 6, wherein
the venetian blind main body is inserted into a first notch on a top of the venetian blind upper rail to block leaking wires of the motor and the stopper; and
the sealing cover and the hiding cover are inserted into a second notch on a side face of the venetian blind upper rail.

8. The rechargeable electric externally-hung venetian blind assembly according to claim 5, wherein
   the venetian blind main body is inserted into a first notch on a top of the venetian blind upper rail to block leaking wires of the motor and the stopper; and
   the sealing cover and the hiding cover are inserted into a second notch on a side face of the venetian blind upper rail.

9. The rechargeable electric externally-hung venetian blind assembly according to claim 8, wherein
   a first double faced adhesive tape is attached to a back of the wire connector, and the first double faced adhesive tape is attached to the surface of the upper cover;
   the controller is installed on the wire connector;
   a second double faced adhesive tape is attached to a back of the solar panel, and the second double faced adhesive tape is attached to a surface of the cover plate; and
   a charging connector is inserted into a charging port of the controller.

\* \* \* \* \*